2,945,879

RESOLUTION OF DL-GLUTAMIC ACID

Ingmar Sollin, Morton Grove, Ill., assignor to International Minerals & Chemical Corporation, a corporation of New York No Drawing. Filed Dec. 29, 1955, Ser. No. 556,053

4 Claims. (Cl. 260—501)

This invention relates to a process for resolving racemic modifications of optically active compounds, and more particularly, to a process for the resolution of DL-glutamic acid.

Glutamic acid is a well known amino acid which exists in the optically active, as well as racemic, form. Only the L- form of this acid is biologically active, and is the one principally in commercial demand. Chemical processes for the synthesis of glutamic acid result in the formation of the racemic modification of this compound, that is, optically neutral DL-glutamic acid. This racemic modification, although having no value in commerce as such, would be very valuable if a simple method were available for resolving it to produce the optically active L-glutamic acid. One of the factors which has heretofore prevented the commercial production of synthetic L-glutamic acid has been the lack of a commercially feasible procedure for resolving the racemic modification of glutamic acid into its enantiomorph.

One object of the instant invention is to provide a process for the resolution of DL-glutamic acid, utilizing economically feasible reaction periods.

Another object of the invention is to provide a process for recovering the optically active forms of glutamic acid from its racemic modification.

In accordance with this invention, a racemic modification of an amino dicarboxylic acid containing more than three but less than nine carbon atoms, for example, DL-glutamic acid, and an optically active form of tyrosinhydrazide are dissolved in a mixture of water and a water miscible organic solvent. The pH of the mixture is adjusted, if necessary, to between about 5.7 and about 6.5, and the mixture is agitated, preferably at a temperature between about 15° C. and about 40° C. until equilibrium is substantially established. Equilibrium will usually be reached after between about 10 hours and about 20 hours. In the case where L-tyrosinhydrazide is used as a resolving agent for DL-glutamic acid, L-tyrosinhydrazide D-glutamate will be precipitated, and when D-tyrosinhydrazide is used as the resolving agent, D-tyrosinhydrazide L-glutamate will be precipitated. Similar salt will be formed where other DL-amino dicarboxylic acids are substituted for DL-glutamic acid. The precipitated salt may be removed from the reaction mixture by any convenient means, for example, by filtration.

In accordance with one embodiment of this invention, DL-glutamic acid is dissolved along with at least an equivalent weight of L-tyrosinhydrazide in an aqueous-organic solvent mixture, and preferably one part of DL-glutamic acid will be dissolved along with between about 1.0 and about 1.05 equivalent weights of L-tyrosinhydrazide in an aqueous lower alcohol mixture containing between about 20% and about 40% water and between about 80% and about 60% lower alcohol. The concentration of solids in solution should be between about 5 and about 15% and preferably between about 8% and about 10% by weight.

The aqueous alcohol mixture is adjusted, if necessary, to a pH of between about 5.7 and about 6.5, preferably a pH of about 6, by adding additional L-tyrosinhydrazide. Agitation of the solution is then begun and continued until equilibrium is substantially established. The precipitated salt of L-tyrosinhydrazide D-glutamate may be separated from the aqueous phase by filtration. By washing the separated crystals with an organic solvent, L-tyrosinhydrazide D-glutamate is obtained in substantially pure form.

In order to recover D-glutamic acid from L-tyrosinhydrazide D-glutamate, the salt is dissolved in water and the pH adjusted to the alkaline side, preferably to a pH between about 8 and about 9 and more preferably, to a pH of about 8.4, by addition of aqueous sodium hydroxide or comparable base. The adjusted solution is stirred for about 1 to 3 hours at room temperature and then filtered to remove solid L-tyrosinhydrazide which precipitates from the solution under the existing alkaline conditions. L-tyrosinhydrazide thus recovered may be reused to resolve an additional quantity of DL-glutamic acid. The L-tyrosinhydrazide mother liquor may be processed to remove D-glutamic acid by adding sufficient acid such as, for example, concentrated hydrochloric acid to adjust the pH to about 3.2 and agitating for about 1 to 3 hours. D-glutamic acid, which crystallizes from the solution, may be removed by filtration. In accordance with this procedure, D-glutamic acid may be recovered in a yield of about 65% of the theoretical.

The filtrate remaining following the separation of L-tyrosinhydrazide D-glutamate from its mother liquor contains L-tyrosinhydrazide, DL-glutamic acid and excess L-glutamic acid. Recovery of the L-glutamic acid from this filtrate is accomplished by first concentrating the filtrate to remove an isopropanol-water mixture and adjusting the concentrated solution to the alkaline side, preferably to a pH of between about 8 and about 9, by addition of sufficient aqueous sodium hydroxide or similar base. Agitation of the adjusted solution for 1 to 3 hours at room temperature results in precipitation of L-tyrosinhydrazide which may be removed from the aqueous phase by filtration and reused. The remaining mother liquor may be processed for the recovery of L-glutamic acid and DL-glutamic acid by first diluting with water and adjusting to a pH of about 3.2 by addition of sufficient concentrated hydrochloric acid. Seeding the adjusted solution with a small quantity of L-glutamic acid crystals and agitating the admixture for a few hours results in the preferential crystallization of L-glutamic acid from the solution. Crystalline L-glutamic acid may be removed from its mother liquor by filtration. Following separation of L-glutamic acid, the aqueous phase is concentrated to remove water, and DL-glutamic acid, which precipitates during the concentration procedure, may be removed by filtration. D-glutamic acid, produced by the above procedure, may in accordance with a specific embodiment of this invention be racemized to DL-glutamic acid and the latter then resolved to L-glutamic acid and D-glutamic acid in accordance with the disclosed invention. Racemization can be effected by heating L- or D-glutamic acid to a temperature above about 180° C. whereby the glutamic acid values are converted to 2-oxo-5-pyrollidine carboxylic acid which may be hydrolyzed to DL-glutamic acid by conventional procedures. By racemizing any D-glutamic acid recovered during the process, and then resolving the racemic modification produced, substantially all DL-glutamic acid may be converted to commercially valuable L-glutamic acid.

Any water miscible organic solvent in which the D-, L- or L-, D- salts (as disclosed above) of tyrosinhydrazide and glutamic acid, an amino dicarboxylic acid, are substantially insoluble may be utilized in carrying out this invention. Dimethylformamide, dioxane and similar organic solvents may be utilized, but lower alcohols such as methanol, ethanol, propanol, butanol, etc., are preferred as producing best resolutions with the greatest conveninence. Isopropanol and methanol are particularly preferred solvents useful in this invention.

The amount of solvent utilized in any given instance will depend upon the temperature employed. When isopropanol is utilized as the organic solvent, a ratio of water to isopropanol of between about 4:7 and about 1:2 is preferred. A ratio of water-organic solvent mixture to solids during the resolution also will depend upon the temperature employed. At higher temperatures, a smaller amount of water-organic solvent mixture must be utilized due to the higher solubility of the salts. In a preferred embodiment of the invention, a solids:water:isopropanol ratio of 1:4:7.26 by weight is utilized as resulting in the highest yields of the desired salt and consequently the greatest resolutions of DL-glutamic acid.

Although the invention has been exemplified above by reference to glutamic acid, it is equally applicable to the resolution of other amino dicarboxylic acids containing more than three but less than nine carbon atoms. Preferably the invention is applied to the resolution of DL-glutamic acid, and similar alpha-amino dicarboxylic acids.

Generally speaking, the process of this invention is desirably carried out at a temperature between about 15° C. and about 60° C. although temperatures outside of this range may be utilized if lower yields are acceptable and the attendant inconvenience is not objectionable. Preferably, the reaction is carried out at room temperatures.

Tyrosinhydrazide, in one of its optically active forms, may be prepared from the corresponding optically active form of tyrosine butyl ester. For example, L-tyrosinhydrazide may be prepared from the n-butyl ester of L-tyrosine, which may be prepared by conventional procedures from L-tyrosine. Synthesis of L-tyrosinhydrazide may be accomplished by suspending 1/10 mole of L-tyrosine butyl ester in 3 moles of n-butanol and adding 0.2 mole of hydrazine hydrate. After stirring the mixture at 100° C. for about 8 hours and then cooling, L-tyrosinhydrazide crystals separate and may be removed by filtration. About a 90% yield is obtained.

The following example illustrates a specific embodiment of this invention. All parts and percentages are by weight unless otherwise indicated.

*Example*

DL-glutamic acid in the amount of about 73.56 parts and L-tyrosinhydrazide in the amount of about 97.61 parts were dissolved with agitation in 425 parts of water by heating the mixture to about 45° C. An additional 4.9 parts of L-tyrosinhydrazide was added to the solution to adjust the pH from 5.7 to about 6.0. Five grams of activated carbon were added, and the solution was stirred for 30 minutes and filtered. The filtrate cake was washed with about 200 parts of water and the filter transferred to a tared vessel. Additional water was added to give a total solution amounting to 685 parts and to this solution was added with agitation about 1,284 parts of commercial grade isopropanol. Crystallization of L-tyrosinhydrazide D-glutamate salt was effected by seeding the solution with 0.2 part of L-tyrosinhydrazide D-glutamate crystals and agitating for 24 hours at 25° C. Solids which crystallized during the agitation period were removed by vacuum filtration and washed twice with about 22 parts of commercial grade isopropanol. After drying the crystals to constant weight in an 80° C. oven, it was found that 76.9 parts of L-tyrosinhydrazide D-glutamate crystals had been obtained. The crystal crop was found to be 86.7% pure with respect to L-tyrosinhydrazide D-glutamate salt. The L-tyrosinhydrazide D-glutamate salt had a melting point of 193° C. and optical rotation $[\alpha]_D^{25} = 28.28$ at a concentration of 4.00% in a 5% hydrochloric acid solution. The compound had a hydrazine content of 9.7% as compared with 9.4% for the theoretical. D-tyrosinhydrazide L-glutamate salt was prepared similarly and identified by means of melting point, optical rotation, and hydrazine content.

L-tyrosinhydrazide was recovered from the crystal crop comprising L-tyrosinhydrazide D-glutamate salt by dissolving 75.5 parts of the latter crystals in 200 parts water and adjusting the pH of the resulting solution to about 8.4 by the addition of 24.9 parts of 50% aqueous sodium hydroxide solution. Precipitation of L-tyrosinhydrazide from this solution was effected by stirring the solution at 25° C. for about 2 hours and then cooling to about 0-5° C. for about 12 hours. L-tyrosinhydrazide crystals were separated from the aqueous phase by filtration and washed with 25 parts of water. After again washing the crystals with an additional 5 parts of water, the crystals were dried to constant weight in an 80° C. oven. Recovery of L-tyrosinhydrazide in this manner was determined to be about 96% of the theoretical.

Mother liquor remaining following separation of L-tyrosinhydrazide was concentrated and the pH adjusted to about 3.2 with concentrated hydrochloric acid. The solution was cooled to 0-5° C. for about 4.5 hours and filtered. Solid glutamic acid crystals, which precipitated, were removed by filtration, washed with water and dried to constant weight. The yield of glutamic acid values amounted to 95.8% of the theoretical. These glutamic acid values contained about 66% of the D-glutamic acid present in the starting DL-glutamic acid.

Mother liquor remaining following separation of L-tyrosinhydrazide D-glutamate, which mother liquor contained L-tyrosinhydrazide, DL-glutamic acid and L-glutamic acid, was concentrated to remove excess water and isopropanol and adjusted to pH 8.4 by addition of 23.8 parts of 50% aqueous sodium hydroxide solution. The adjusted solution was agitated at 25° C. for about 2 hours and cooled to 0-5° C. for a period of about 12 hours. L-tyrosinhydrazide crystals which precipitated were removed by filtration, washed with two portions of water and dried to constant weight in an 80° C. oven. Recovery of L-tyrosinhydrazide amounted to 93.1% of the theoretical.

The filtrate remaining following separation of L-tyrosinhydrazide crystals was adjusted to a 4% solution with respect to the DL-glutamic acid present (18.9 parts) and the resulting dilute solution had a total weight of about 493 parts. Concentrated hydrochloric acid was added to the solution to adjust the pH from about 8.4 to about 3.2 and the adjusted solution was seeded with a few crystals of L-glutamic acid and agitated for two hours. L-glutamic acid preferentially crystallized under these conditions and the precipitated crystals were removed by filtration, washed with 5 parts of water and dried to constant weight in an 80° C. oven. The L-glutamic acid crystals obtained had an optical purity of 97.8% and were removed in the amount of 24.5 parts corresponding to a net yield of L-glutamic acid of 67%, based on the weight of L-glutamic acid in the starting material.

Having thus fully described and illustrated the character of the instant invention, what is desired to be secured by Letters Patent is:

1. A process for resolving racemic glutamic acid which comprises preparing a solution of racemic glutamic acid and at least about an equivalent weight of an optically active form of tyrosinhydrazide in a mixture of water and isopropanol, the ratio of water to isopropanol being between about 4:7 and about 1:2, agitating the solution at a temperature between about 15° C. and about 40° C., whereby a tyrosinhydrazide glutamic salt forms and precipitates from said solvent mixture, said salt having its acid and basic components of opposite stearic configuration, and separating said salt from the reaction mixture.

2. The process of claim 1 in which the solids:water: isopropanol ratio is about 1:4:7.26.

3. A process for resolving DL-glutamic acid which comprises reacting DL-glutamic acid with between about 1.0 and about 1.05 equivalent weights of an optically active form of tyrosinhydrazide in solution in aqueous isopropanol, said solution containing between about 60% and about 80% isopropanol by weight and the remainder water, crystallizing tyrosinhydrazide glutamate salt from the reaction solution, separating the crystals from the liquid phase, adjusting the pH of the liquid phase to between about 8 and about 9 to precipitate tyrosinhydrazide, separating solids from the liquid phase, adjusting the liquid phase to a pH of about 3.2 and crystallizing and separating an optically active form of glutamic acid therefrom.

4. The process of claim 3 in which the optically active form of tyrosinhydrazide is L-tyrosinhydrazide and L-glutamic acid is recovered from the mother liquor of the L-tyrosinhydrazide D-glutamate salt produced.

References Cited in the file of this patent
UNITED STATES PATENTS 2,556,907     Emmick _____ June 12, 1951

OTHER REFERENCES

Curtius: J. Pract. Chem. vol. 203 (New printing 95), pp. 353–354 (1917).

Gilman: Organic Chem. (1938), vol. 1, pp. 189–193.

Noller: Chemistry of Organic Compounds, pp. 332–333 (1951).

The Merck Index, p. 465, sixth edition (1952).